AUTOMATIC COIN RETURN FOR TELEPHONE PAYSTATIONS

Filed March 9, 1965 3 Sheets-Sheet 1

INVENTOR
A. E. JOEL, JR.
BY [signature]
ATTORNEY

Nov. 5, 1968 A. E. JOEL, JR 3,409,739

AUTOMATIC COIN RETURN FOR TELEPHONE PAYSTATIONS

Filed March 9, 1965 3 Sheets-Sheet 2

United States Patent Office 3,409,739

Patented Nov. 5, 1968

3,409,739

AUTOMATIC COIN RETURN FOR TELEPHONE PAYSTATIONS

Amos E. Joel, Jr., South Orange, N.J., assignor to Bell Telephone Laboratories, Incorporated, New York, N.Y., a corporation of New York Filed Mar. 9, 1965, Ser. No. 438,319
11 Claims. (Cl. 179—6.3)

ABSTRACT OF THE DISCLOSURE

A prepay telephone coin return system in which deposit of a coin immediately initiates the operation of coin return circuitry in the central office regardless of the position of the switchhook. The coin return circuitry will subsequently return the deposited coins after a predetermined delay unless prior to the running of the delay period the cutoff relay operates, indicating that a request has been made to the central office for service, whereupon the operation of the coin return circuitry is aborted. The coin return circuitry may also be enabled only after a continuity test has been made under control of a stepping circuit which allows a pair of lines to be scanned in succession for continuity.

This invention relates to telephone paystations and more particularly to an automatic coin return for telephone paystations.

Telephone paystations, or coin stations as they are also commonly called, are of course being used in constantly increasing numbers, and, in order to offer maximum service and convenience to the public, it has recently become the general practice to place such stations in relatively remote areas, as well as in the more protected areas as heretofore. For example, telephone paystations are now commonly provided at such places as railroad station platforms, along the town and city sidewalks and along many highways and expressways. While this practice has contributed vastly to the safety and convenience of the traveling public, it has at the same time resulted in increasing the susceptibility of the equipment to the hazards of thievery and vandalism. In particular, the relatively remote location of many of these paystations has played into the hands of those wrongdoes who are bent upon schemes for so tampering with the paystation equipment that the normal operation thereof is prevented. For example, one such unlawful practice involves "anchoring" the switchhook in such a way that it remains in the "off" or "down" position when the handset is removed rather than moving to its "up" position whereby to close the station line circuit.

As is well known, the use of the majority of telephone paystations of the "prepay" type involves removal of the handset followed by deposit of a coin for obtaining dial tone after which the called number is dialed. Obviously, if the switchhook fails to move to line closing position when the handset is removed, no dial tone will be forthcoming even though the caller, probably failing to notice the switchhook condition, deposits his coin as usual. Since the line remains open the call cannot be completed and, further, the caller has no immediate way of recovering his coin. However, the vandal who "rigged" the station set will return at an opportune time, release the anchored switchhook, and "collect" all coins trapped since his last visit. This type of fraud is particularly annoying to the telephone operating companies, both because of a direct loss of revenue and, even more important, due to the fact that such a condition tends to affect adversely the public opinion factor which the companies consider of major importance in dealings with their customers. The person attempting to make a call from a paystation and failing to obtain dial tone may well tend to place the blame on "poor equipment" or "inefficient operations" by the company; failure to recover his coin adds, of course, to his disgruntlement. All in all, the situation is one which the telephone companies have been particularly anxious to correct.

Accordingly, an object of the invention is to enhance the reliability of service provided by telephone paystations.

Another object of the invention is to prevent loss of a deposited coin due to an inoperative condition of the paystation.

A more specific object of the invention is to automatically return a deposited coin in the event the paystation switchhook is in an inoperative condition.

In accordance with a specific embodiment of the invention, deposit of a coin in the usual manner closes a path through a delay device to a special coin return circuit, this path being set up regardless of the switchhook position. The path referred to includes a break contact of the cutoff relay so that the path will be interrupted by operation of that relay. At the expiration of the time interval determined by the delay device the coin return circuit operates to return the coin. However, in the event the cutoff relay operates in its normal manner before the end of the time interval, the coin return circuit is not closed, the call proceeds in the normal manner, and the coin is subsequently collected.

In accordance with a further embodiment of the invention a stepping circuit and continuity testing means are provided in conjunction with the automatic coin return circuit. In this embodiment of my invention, a plurality of coin lines are scanned, a pair at a time, to determine that the coin lines themselves have not been cut, that is, that there is successful completion of a continuity test. After completion of the continuity test, then the presence of a coin ground can be detected and timed, the coin return circuit being enabled to return the coin, as described above, if the cutoff relay does not operate in the normal manner within a specified time. This scanning is advantageously accomplished by a stepping circuit which can scan about one thousand pairs of coin lines each minute if no coin grounds are detected.

If a coin has been deposited at one of the paystations and a coin ground is therefore present, the stepping circuit stops and the special coin return circuit is energized; then if the cutoff relay is not operated within the specified time interval, the coin is returned as above. The number of coin lines that can be monitored by one circuit including the continuity test feature will therefore not depend on the speed of the stepping or scanning circuit but on the maximum expected amount of coin traffic being initiated at substantially the same time.

A feature of my invention is an automatic coin return circuit unaffected in its operation by switchhook position.

A further feature of my invention is circuitry for timing the period of the coin deposit before operating the coin return circuit and rendering the coil return circuit ineffective in the event the call completing circuit operates normally.

It is a further feature of one embodiment of my invention that the coin return test circuit be enabled only after a continuity test has been made. Further in accordance with this embodiment of my invention a plurality of coin lines are continuously scanned for continuity, with no interruption of scanning unless a coin ground is present at one coin line, in which case the continuity scanning is interrupted and the coin return test circuit enabled.

A full understanding of the arrangement contemplated by the present invention as well as an appreciation of the various features thereof may be gained from consideration of the following detailed description in connection with the accompanying drawing in which.

Figures 1, 4:
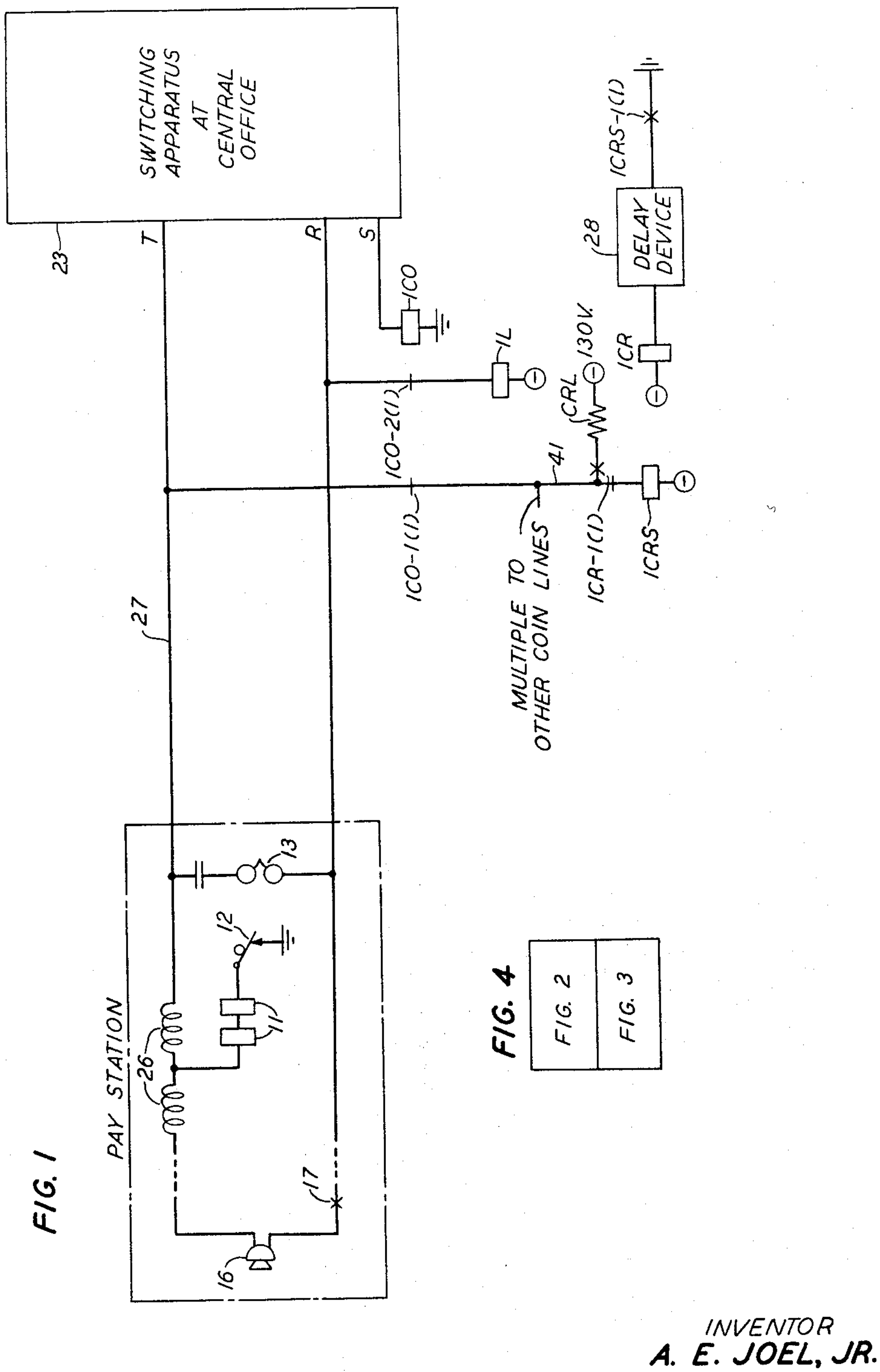
FIG. 1 shows schematically one specific illustrative embodiment of the invention utilized in connection with a telephone paystation line.
FIG. 4 shows the manner in which certain of the figures should be arranged to show a specific illustrative embodiment of the invention.

In the drawing, the circuits illustrated are arranged in the so-called "detached contact" type of representation wherein, generally speaking, relay contacts are shown separated from the relay winding which controls the respective contact. This type of disclosure permits functional groups of circuitry to be shown separately, thus facilitating an understanding of the operational features involved. Each designation of a relay winding is preceded by a numeral indicating the figure of the drawing in which the apparatus appears, for example, the winding of relay 1CO which appears in FIG. 1. Further, each contact designation is followed by a numeral in parentheses which indicates the figure of the drawing in which the contact appears, for example, the designation "1CRS–1(1)" indicates that contact No. 1 of relay 1CRS appears in FIG. 1; as indicated by the designation "1CRS" the relay winding also appears in FIG. 1. In accord with usual circuit design, transfer contact pairs may be either Early Make-Break (continuity) or Early Break-Make (sequence transfer) as dictated by the particular operational requirements.

Referring now to the drawing, the first to FIG. 1, there are shown schematically the main portions of a prepay paystation circuit; included in the schematic showing are the coin magnet or relay 11, coin tray switch 12, ringer 13, transmitter 16 and switchhook 17. The paystation may, for example, be of the general type disclosed in United States Patent 1,043,219, issued Nov. 5, 1912, to O. F. Forsberg.

Figure 2:
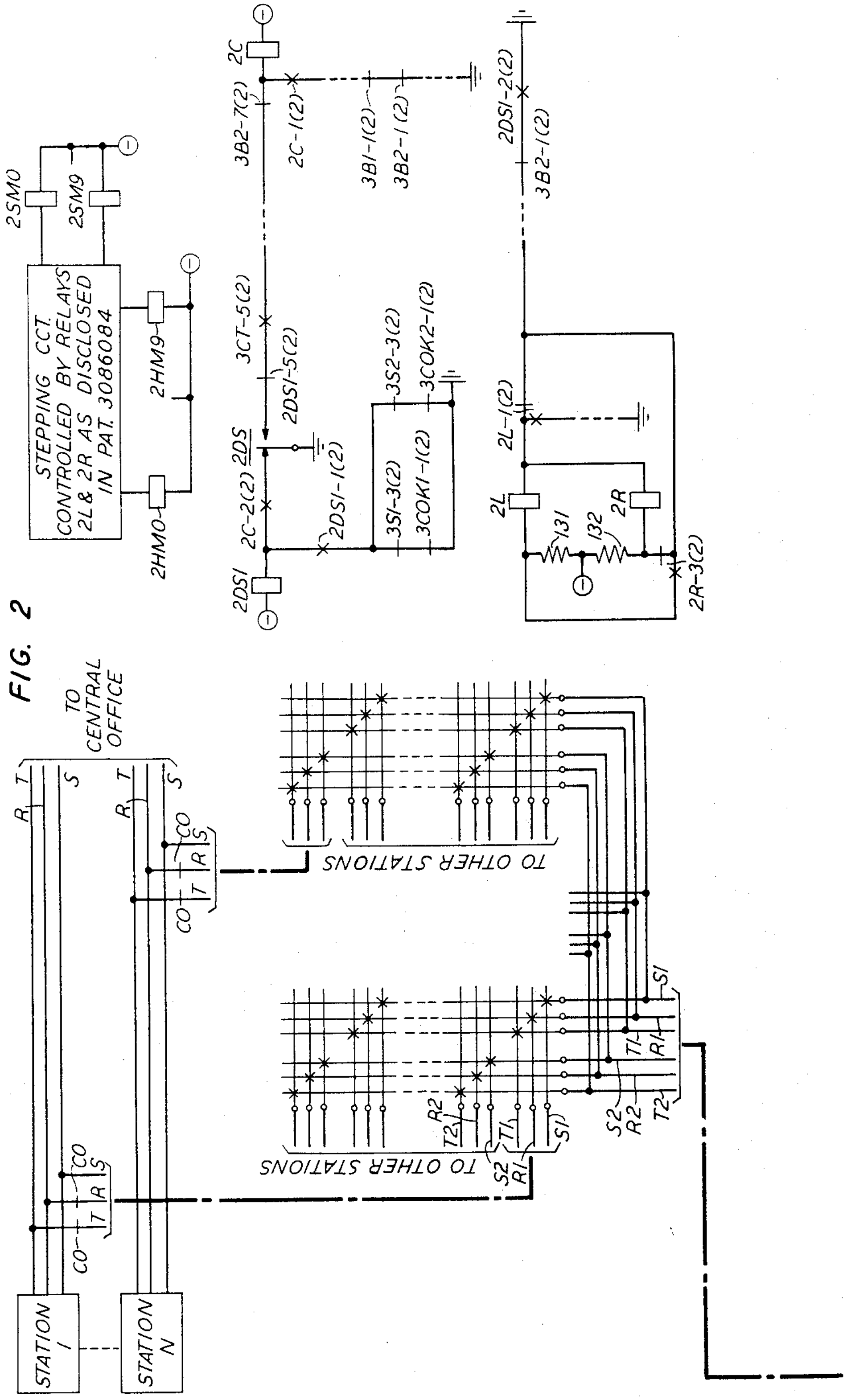
FIG. 2 shows schematically a portion of the connector switches utilized in connection with one embodiment of the invention together with a portion of the stepping circuit utilized in that embodiment.

Only a portion of the automatic telephone switching system is shown; included in the showing are the cutoff relay 1CO and the line relay 1L. Other switching apparatus is represented by captioned box 23. The overall circuit arrangement with regard to the line and cutoff relays and associated elements may be, for example, generally similar to that disclosed in United States Patent 2,370,239, issued Feb. 27, 1945, to O. A. Friend (FIG. 2).

Assuming now that a coin is deposited in the paystation set by a customer desirous of initiating a call, the weight of the coin closes switch 12 to ground in the usual manner. The ground is applied through the windings of coin relay 11 and the right-hand winding of induction coil 26 to tip lead 27 of the line. The ground on tip 27 is connected through break contact 1CO–1(1) of the cutoff relay and the break contact of transfer pair 1CR–1(1) to the winding of relay 1CRS and therethrough to battery whereby to operate relay 1CRS. Relay 1CRS, operated, closes at make contact 1CRS–1(1) an operate path for relay 1CR; relay 1CR does not operate immediately following operation of relay 1CRS, however, since delay device 28 is included in the operate path.

Delay device 28 may be any one of several delay devices known in the art; for example, it may be of the general type utilizing a capacitor and gas-filled tube as disclosed in United States Patent 3,001,027, issued Sept. 19, 1961, to J. M. Armstrong and M. C. Goddard.

The interval measured by delay device 28 is so established that the operation of relay 1CR is delayed beyond the normal operate time of cutoff relay 1CO assuming a normal circuit condition. That is, in the event the telephone station and switching circuits and equipment are in normal operating condition when the coin is deposited, cutoff relay 1CO will operate before the expiration of the interval measured by delay device 28 and the operate path of relay 1CRS will be interrupted at break contact 1CO–1(1). The telephone switching functions will be performed in their normal fashions and the call will be completed in the usual manner. Since the operate path of relay 1CRS has been interrupted, this relay will release interrupting in turn the operate path of relay 1CR. Accordingly, the special coil return circuit does not function at this time.

It will be assumed now for purposes of further description that the telephone station and switching circuits are not in normal operating condition; specifically it will be assumed that the switchhook 17 has been surreptitiously anchored in "off" position so that the telephone station line circuit is not closed when the customer removes the handset. Accordingly line relay 1L and cutoff relay 1CO do not operate in their normal manner and the operate path for relay 1CRS through break contact 1CO–1(1) remains uninterrupted, that is, assuming of course, that a coin was deposited. At the end of the time interval measured by delay device 28, the operate path for relay 1CR is closed and relay 1CR operates. A path is now closed at the make contact of transfer pair 1CR–1(1) for application of "coil return battery," i.e. −130 volts, through ballast lamp resistor CRL, over the tip lead 27, and through the coin relay 11 to the ground at coin tray switch 12. (Transfer pair 1CR–1(1) is Early Make-Break that is the path for application of the coin return battery is closed at the make contact before the operate path of relay 1CRS is interrupted at the break contact.)

Application of the coin return battery is effective to operate coin relay 11 in a manner whereby to "return" the deposited coin to the customer; this operation may be similar generally to the mode of operation described in the above-mentioned Patent 1,043,219 to O. F. Forsberg. After return of the coin and release of coin tray switch 12, the ground is removed from tip 27 and the operate path of relay 1CRS, and relays 1CRS and 1CR and the other elements of the special coin return circuit are restored to normal condition.

The timed operation of the circuit is so arranged that in the event the paystation is in inoperative condition due, for example, to tampering with the switchhook, the coin will be returned to the customer with such a short delay that there will be no chance that he will abandon the call and leave the booth before he has retrieved his coin. This, of course, presupposes an adequate delay to permit normal operation of the cutoff relay as described above, but under normal operating conditions when the coin is deposited after removal of the handset from the switchhook, the cutoff relay will operate within one-half second after the deposit of the coin. Delay device 28 may be so arranged that the operation of the special coin return circuit will occur about two seconds after coin deposit in the absence of cutoff relay operation before the end of the period.

Inclusion of the CRL ballast lamp resistor in the coin return battery path assures a gradual buildup of potential whereby to prevent a possible loud acoustical disturbance when the path is first closed.

As indicated by the showing of a tap on lead 41 it is contemplated that the lead will be multiplied to other telephone paystation lines whereby the special coin return circuit may serve a plurality of such lines; it is anticipated that as many as 200 lines may be adequately served by a single coin return circuit. While the coin ground present at one paystation will be applied through the multiple connection to the tip leads of other coin lines whose cutoff relays are not operated, inasmuch as the switchhook contacts of these other paystations will not be closed, the presence of this tip lead ground will not affect the respective line switching apparatus at the central office.

Figure 3:
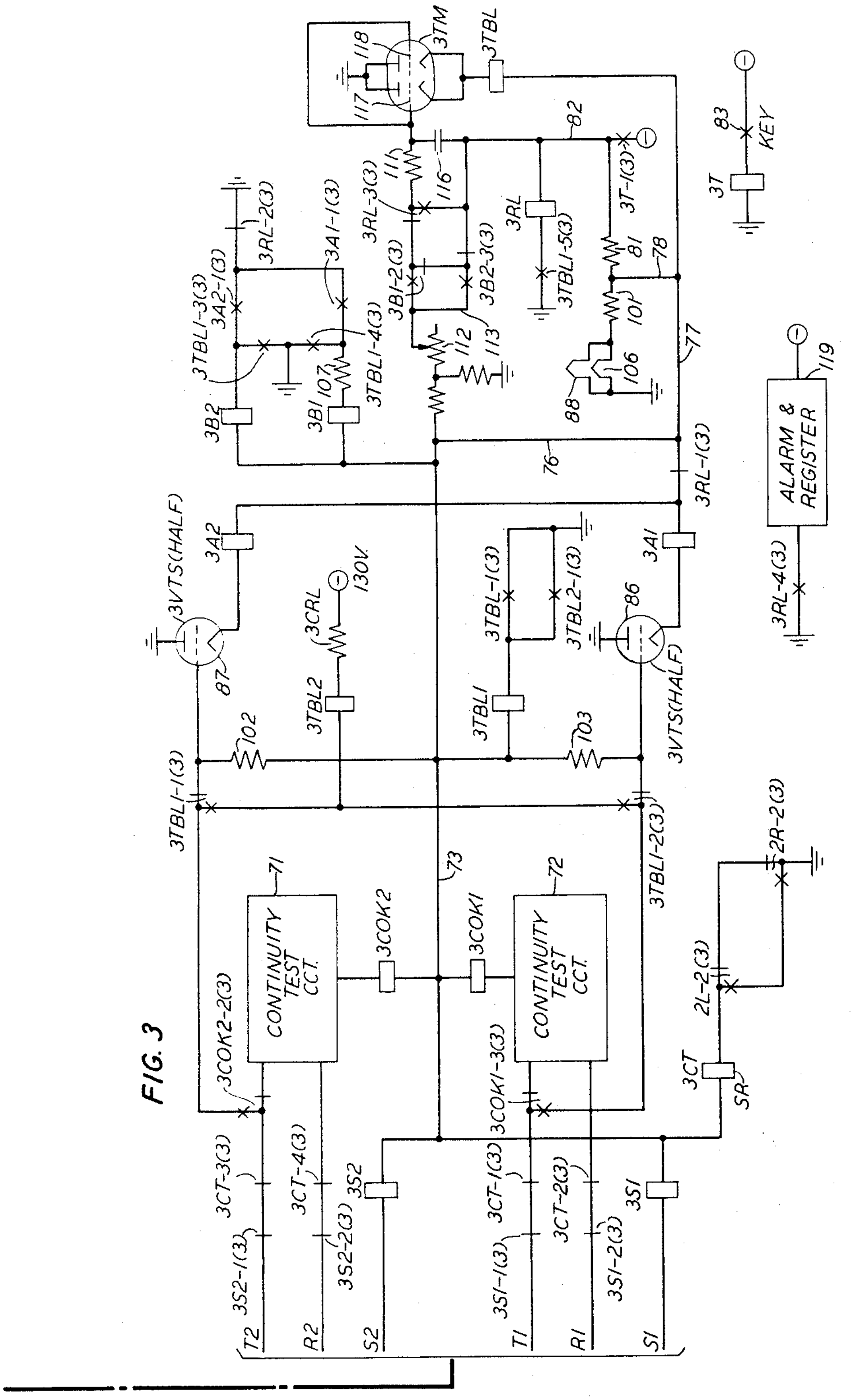
FIG. 3 shows the circuit arrangement of the embodiment of the invention utilizing the stepping circuit of FIG. 2 and providing a continuity test in connection with the coin ground test.

Referring now to FIGS. 2 and 3 of the drawing, there is disclosed a modification of the invention wherein the coin return circuit is arranged in conjunction with a "walking" or stepping circuit of the general arrangement disclosed in United States Patent 3,086,084, issued Apr. 16, 1963 to C. E. Brooks, H. J. O'Neill and W. M. Stover. Since the stepping or advancing circuit is fully described in the patent just mentioned, and in order to avoid undue enlargement and complication of the present disclosure, the stepping circuit will be described herein only to the extent necessary for full understanding of the present invention.

In addition to the illegal practice of switchhook anchoring referred to above, another form of vandalism having a similar result involves actually opening one or both of the line wires at the paystation. At opportune times the person responsible for the illegal act will visit the location, reconnect the line wire or wires and "collect" any coins trapped during the interval. In order that the coin ground test is not applied to such "open" lines (obviously no ground would be detected) a continuity test is made on each line as connected by the stepping circuit. In the event the continuity test is "favorable," i.e., that an "open" is not indicated, the stepping is halted for the ground test; in the event the line is found open, however, the stepping is continued to the next pair of lines. The "open line condition" referred to is, of course, the type of open resulting from an abnormal condition, such as illegal tampering with the line wires as just mentioned, and not to the normal open line resulting from an "off" position of the switchhook.

The continuity test circuits, shown as captioned boxes 71 and 72, may be any one of many types of continuity test circuits well known in the art; for example they may follow the general arrangement disclosed in United States Patent 2,141,373, issued Dec. 27, 1938, to F. E. Blount and P. Husta, or in United States Patent 2,181,560, issued Nov. 28, 1939 to F. E. Blount. In the event the continuity test is successful the respectively associated relay is operated, that is relay 3COK1 associated with continuity test circuit 72 and relay 3COK2 associated with continuity test circuit 71.

It will be assumed now that line No. 1 (T1; R1; S1) and line No. 2 (T2; L2; S2) have been connected to the testing circuit through operation of the stepping circuit. Since the coin test should not be applied, of course, if the line being scanned is busy on a call connection, relays 3S1 and 3S2 are associated with the respective lines and function to cancel the test in the event the particular line is in a busy condition. For example, assuming that line No. 1 is busy when connected by the stepping circuit, ground will be present on the sleeve S1 due to the normal circuit operations and relay 3S1 will operate from this ground, winding of relay 3S1, leads 73, 76, 77, 78, resistor 81, make contact 3T–1(3) to battery. (Relay 3T operated following closing of the START key 83.) Relay 3S1, operated, opens the tip T1 and ring R1 at respective break contacts 3S1–1(3) and 3S1–2(3).

Relay 3CT is provided in order to delay cutting in the continuity test a sufficient time whereby to assure adequate time for relay 3S1 and/or 3S2 to operate in the event the associated line is in a busy condition when the line is scanned. When relays 2L and 2R are both either operated or released, relay 3CT will operate from the battery at make contact 3T–1(3). Relay 3CT, operated, opens the tip and ring of line 1 at break contacts 3CT–1(3) and 3CT–2(3) and opens the tip and ring of line 2 at break contacts 3CT–3(3) and 3CT–4(3). Relay 3CT, which is slow to release, starts to release when either relay of the pair 2L–2R is in an opposite state to that of the other; this condition is coincident with the operation of the hold magnet of the stepping circuit crossbar switch which cuts through the line to the test circuit.

Assuming now that neither line being scanned is in busy condition at the moment and that relays 3S1, 3S2 and 3CT are in released position, a continuity test will be applied to line 1 by continuity test circuit 72 and a similar test will be applied to line 2 by continuity test circuit 71; assuming, further, that both tests are "successful," that is that neither line is "open," relays 3COK1 and 3COK2 will operate. Accordingly, the holding circuit of relay 2DS1 will be interrupted at break contacts 3COK1–1(2) and 3COK2–1(2). Ground will be removed at make contact 2DS1–2(2) from the operate path of stepping relays 2L and 2R and the stepping or walking action will be temporarily halted with lines 1 and 2 connected for the coin ground test, as described below. (As pointed out above the details of the stepping circuit are not described herein since the stepping circuit which is fully described in the previously-referred-to C. E. Brooks et al. Patent 3,086,084 is assumed to be used for the present purpose. It will be sufficient for purposes of the present description to keep in mind the fact that the stepping circuit operation is controlled generally by the position, operated or released, of the 2L and 2R relays.)

It will be assumed now that a coin has been deposited at the paystation connected to line 1; the resulting ground on the tip lead is applied through the cutoff relay break contact (corresponding to break contact 1CO–1(1), FIG. 1) to lead T1, through the closed crosspoints of the crossbar switch to the connected test circuit and through break contacts 3S1–1(3) and 3CT–1(3), the make contact of transfer pair 3COK1–3(3), the break contact of transfer pair 3TBL1–2(3) to the grid electrode of lower half 86 of vacuum tube 3VTS.

The circuit is initially turned on by closing key 83 which completes an obvious operate path for relay 3T; relay 3T, operated, closes at make contact 3T–1(3) a path for connecting battery to heater element 88 of vacuum tube 3VT; the battery is also connected to grid bias resistors 102 and 103 over leads 78, 76 and 73. For purposes of convenient illustration and clear description, vacuum tube 3VTS, a multielement tube, is shown in two halves and the heater element 88 is shown separately. To aid still further in subsequent description the upper half of the tube is designated 87 and the lower half is designated 86. It will be assumed that in the present specific illustrative embodiment of the invention the voltage at the common junction point of resistors 101 and 81 will be approximately 4 volts positive with respect to the −48 volt supply. At the end of the normal heating period of the tube, operating conditions are established whereby both halves 86 and 87 of the tube are cut off. (Heater element 106 of vacuum tube 3TM is also shown apart from the tube itself; the operation of vacuum tube 3TM will be described subsequently.)

It will be recalled, as pointed out above, that ground on tip T1 resulting from the coin deposit is now applied to the grid electrode of vacuum tube 86; this ground causes the grid electrode to become several volts positive with respect to the cathode and current flows whereby to operate relay 3A1, a polarized relay. Relay 3A1, operated, closes an operate path for relay 3B1 traced from ground, break contact 3RL–2(3), make contact 3A1–1(3), resistor 107, winding of relay 3B1, leads 76, 77, 78, make contact 3T–1(3) to battery. (Resistor 107 included in the operate path of relay 3B1 prevents simultaneous operation of relays 3B1 and 3B2 in the event coin ground should be found on both tip T1 and tip T2 whereby to cause operation of both relays 3A1 and 3A2.)

Relay 3B1, operated, interrupts at break contact 3B1–1(2) the holding path for relay 2C of the stepping control circuit; relay 2C releases and interrupts at break contact 2C–2(2) the operate path of relay 2DS1. Also, relay 3B1, operated, disconnects at the break contact of transfer pair 3B1–2(3) battery (lead 82) from resistor 111 and connects at the make contact of the same transfer pair resistor 111 to the intermediate potential established at the movable contact of variable resistor 112, this path including the break contact of transfer pair 3RL–2(3). (In the present specific illustrative embodiment of the intermediate potential referred to may be set initially at about 5 volts positive to the −48 volt potential.) Capacitor 116 now starts to charge through fixed resistor 111 and variable resistor 112.

As the potential applied to grids 117 and 118 rises, vacuum tube 3TM starts to pass current and relay 3TBL operates after a predetermined interval. By adjustment of variable resistor 112, the time required for relay 3TBL to operate can be varied over a given range. This interval is, of course, a measure of the time during which the coin ground must remain on the tip in order for the condition to be recognized as abnormal, as resulting, for example, from an anchored switchhook at the paystation. (If the telephone station and switching circuits are in normal operating condition and the ground "disappears" due to operation of the pertinent cutoff relay before the expiration of the interval and operation of the 3TBL relay, the stepping circuit will resume its advancing and the test circuit will return to its normal condition.)

Assuming an abnormal condition and that the ground persists, relay 3TBL, operated, closes an operate path for relay 3TBL1 traced from ground, make contact 3TBL–1(3), winding of relay 3TBL1, leads 73, 76, 77, 78, resistor 81, make contact 3T–1(3) to battery.

Relay 3TBL1, operated, closes at make contact 3TBL1–5(3) an obvious operate path for relay 3RL, which operates and interrupts at break contact 3RL–2(3) the operate path of relay 3B1; relay 3B1 holds operated however from ground through make contact 3TBL1–4(3).

Also, relay 3TBL1, operated, closes at the make contact of transfer pair 3TBL1–2(3) a path for application of "coin return" battery, −130 volts, through ballast lamp resistor 3CRL, winding of relay 3TBL2, make contact of transfer pair 3TBL1–2(3), make contact of transfer pair 3COK1–3(3), break contacts 3CT–1(3) and 3S1–1(3), tip lead to the station and through the coin relay to ground at the coin tray switch; application of the coin return battery causes return of the coin in the manner referred to above in reference to the circuit of FIG. 1.

Before actual return of the coin and removal of ground from the tip, relay 3TBL2 will operate over the path just traced; relay 3TBL2, operated, closes at make contact 3TBL2–1(3) a holding path to ground for relay 3TBL1 whereby to assure that the coin return path is maintained to the station until the coin has actually been returned and the ground removed.

Relay 3RL, operated as previously described, interrupts at break contact 3RL–1(3) the operate path of relay 3A1, which releases; closes at make contact 3RL–4(3) an energizing path for alarm and register means 119 and also closes at the make contact of transfer pair 3RL–3(3) a discharge path for capacitor 116. As capacitor 116 discharges, the current passed by vacuum tube 3TM decreases and relay 3TBL releases; assuming the coin ground has been removed from the tip and that relay 3TBL2 has released, relay 3TBL1 wil lnow release. Release of relay 3TBL1 will be followed by release of relay 3B1 since the hold path is interrupted at make contact 3TBL1–4(3); the test circuit is now returned to normal condition.

At the next operation of interrupter 2DS to the right contact, relay 2C will operate from the interrupter ground, break contact 2DS1–5(2), make contact 3CT–5(2), contacts of intervening relays (not shown), break contact 3B2–7(2), winding of relay 2C to battery; relay 2C operates and locks to ground through its make contact 2C–1(2), break contacts 3B1–1(2) and 3B2–1(2) and contacts of intervening relays (not shown). (As pointed out above, the stepping circuit and control thereof may follow the arrangement fully described in the C. E. Brooks et al. Patent 3,086,084 and these circuits are being described in the present instance only to the extent necessary for full and complete disclosure of the present invention.)

With relay 2C now operated, an obvious operate path for relay 2DS1 is closed when interrupter 2DS next operates to the left contact; a locking path for relay 2DS1 is closed through its make contact 2DS1–1(2) provided both relays 3S1 and 3COK1 and/or 3S2 and 3COK2 are in released position.

Relay 2L now operates from ground, make contact 2DS1–2(2), break contact 3B2–1(2), contacts of intervening relays (not shown), break contact of transfer pair 2L–1(2), winding of relay 2L, resistor 131 to battery; relay 2L operates and locks to ground through the make contact of its transfer pair 2L–1(2). When the ground is removed from the path by release of relay 2DS1, relay 2R will operate from battery, resistor 132, winding of relay 2R, make contact of transfer pair 2L–1(2) to ground. Now when the ground is restored at make contact 2DS1–2(2), relay 2L will release since its operate battery is shunted to that ground through resistor 131 and the make contact of transfer pair 2R–3(2). Relay 2R holds operated to the ground at make contact 2DS1–2(2) at this point, however, since the break contact of its transfer pair 2R–3(2) prevents establishment of a shunting path for its operate battery.

Accordingly, a first closure of ground through make contact 2DS1–2(2) is followed, first, by operation of relay 2L and, second, by operation of relay 2R when the ground is removed at make contact 2DS1–2(2); relay 2L releases when the ground is restored at make contact 2DS1–2(2) but relay 2R holds under this condition. As fully described in the C. E. Brooks et al. Patent 3,086,084 referred to above, the operations of the crossbar switch whereby to control the stepping or advancing functions are controlled fundamentally by the alternate operate and release positions of the 2L and 2R relays. As a test is completed therefore, or interrupted due to normal operation of the respective cutoff relay before expiration of the test interval, the stepping circuit operates to connect the next pair of coin lines to the test circuit.

It will be apparent from the above description that there is provided by the novel arrangement contemplated means whereby a coin, deposited by a customer when the station and switching equipment are not in normal operating condition, will be automatically returned without any appreciable delay. This prevents loss of the coin by the customer when a call cannot be completed, due for example, to the switchhook being anchored in "off" position. The completion of calls in the normal manner when the equipment is in operative condition is not interfered with in any manner by provision of the contemplated arrangement.

In accordance with the modification of the basic arrangement, the coin ground test may be applied in turn to a large number of lines through incorporation of the stepping means.

It is to be understood that the above-described arrangements are illustrative of the principles of the invention. Numerous other arrangements may be devised by those skilled in the art without departing from the spirit and scope of the invention.

What is claimed is:

1. In a telephone system, a paystation including coin return means responsive to a coin return signal from a central office, a coin return circuit in the central office for generating said coin return signals, means in the central office responsive to deposit of a coin in said paystation for energizing said coin return circuit after a delay interval, circuit means for extending a call from said paystation, and means effective upon normal operation of said circuit means before expiration of said delay interval for preventing energization of said coin return circuit.

2. In a telephone system the combination defined by claim 1 further characterized in that said circuit means for extending a call includes a cutoff relay and that said preventing means includes a break contact of said cutoff relay.

3. In a telephone system, a paystation including a coin return mechanism, a line extending to a central office, a cut off relay associated with said line, a coin return circuit in the central office for applying a coin return signal to said coin return mechanism, means responsive to deposit of a coin at said paystation for energizing said coin return circuit, means for delaying said energizing means for an interval after the deposit of the coin, and means effective upon operation of said cutoff relay before expiration of said interval for preventing energization of said coin return circuit.

4. In a telephone system, a paystation including coin return means activated by a signal from a central office, a line extending to the central office, a cutoff relay associated with said line, a coin return circuit in the central office for generating said coin return signal, and means responsive to deposit of a coin for activating said coin return circuit when said cutoff relay has remained unoperated for a delay interval following deposit of a coin.

5. In a telephone system the combination defined by claim 4 further characterized in the provision of a plurality of other lines each having a cutoff relay associated therewith and a stepping circuit for connecting said line and said plurality of other lines to said coin return circuit in turn.

6. In a telephone system the combination defined by claim 5 further characterized in the provision of means for testing the continuity of each line before it is connected in turn to said coin return circuit.

7. In a telephone system, a paystation, a line extending to a central office, a cutoff relay associated with said line, means effective upon deposit of a coin at said paystation for connecting ground to one side of said line, a coin return circuit at the central office, said coin return circuit including a first relay, means for connecting said first relay to said one side of said line, a source of coin return battery, a second relay, connection of the ground to said line being effective to operate said first relay, means responsive to operation of said first relay for operating said second relay after a predetermined interval, means effective upon operation of said second relay for connecting said source of coin return battery to said one side of said line, and means effective upon operation of said cutoff relay for disconnecting said relay from said one side of said line.

8. In a telephone system, a paystation including a coin mechanism, a station line loop and a switchhook effective when operated to closed position to close said station line loop, and means energized upon deposit of a coin in said coin mechanism effective to return said coin upon said station line loop remaining open for a predetermined interval following deposit of the coin, said last-mentioned means including a source of coin return battery and means effective a predetermined interval after deposit of the coin for connecting said coin return battery to said coin mechanism.

9. In a telephone system, the combination defined by claim 8 further characterized in the provision of means effective upon closure of said station line loop for preventing operation of said coin return battery connecting means.

10. In a telephone system, the combination defined by claim 9 further characterized in that said preventing means includes a cutoff relay associated with the station line loop and means effective upon closure of said station line loop for operating said cutoff relay.

11. In a telephone system, a plurality of coin stations, a telephone line connected to each said coin station, means for scanning said lines in sequence and testing said lines for continuity, a coin return circuit, means effective upon successful completion of a continuity test and upon deposit of a coin at one of said stations for interrupting said scanning and for connecting said one station line to said coin return circuit, means effective a predetermined interval after connection to said coin return circuit for enegization of said coin return circuit, and means for preventing energization of said coin return circuit upon normal extension of a connection to said one station line within said predetermined interval.

References Cited

UNITED STATES PATENTS

| | | | |
|---|---|---|---|
| 2,168,864 | 8/1939 | Dohle | 179—6.3 |
| 2,370,239 | 2/1945 | Friend | 179—6.3 |

KATHLEEN CLAFFY, *Primary Examiner.*

R. LINN, *Assistant Examiner.*